Patented Aug. 7, 1945

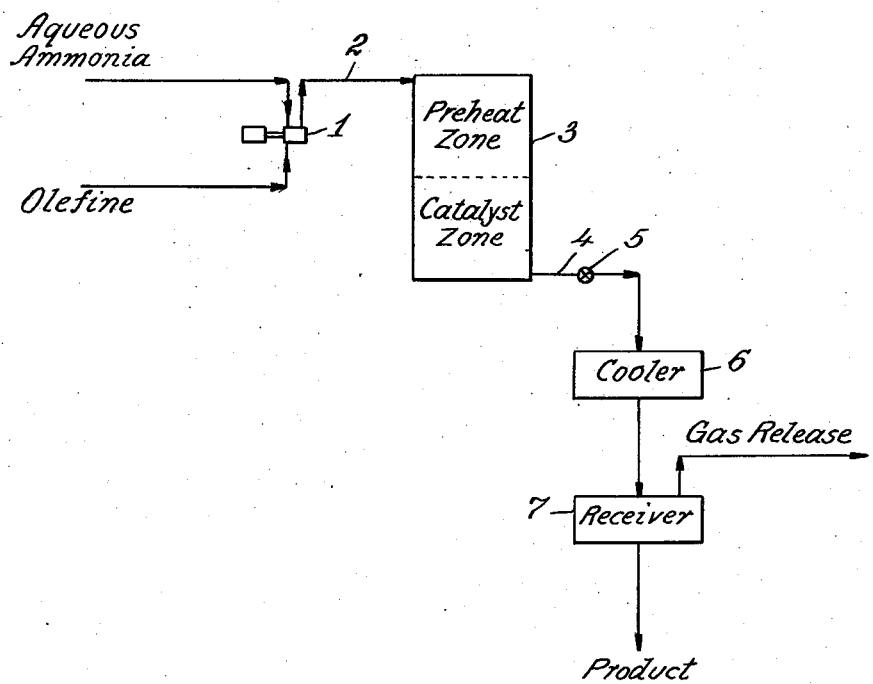

2,381,472

UNITED STATES PATENT OFFICE 2,381,472

PRODUCTION OF ORGANIC COMPOUNDS CONTAINING NITROGEN

John W. Teter, Chicago, Ill., assignor to Sinclair Refining Company, New York, N. Y., a corporation of Maine Application November 13, 1940, Serial No. 365,564

13 Claims. (Cl. 260—464)

This invention relates to the production of amines, nitriles, acid amides and their derivatives from unsaturated hydrocarbons such as those available in gas mixtures produced in the processing of hydrocarbon oils, as in the refining of petroleum, by direct catalytic reaction with ammonia.

Organic nitrogen compounds such as the amines, nitriles, acid amides and their derivatives have a variety of present uses in industry and have potentialities of wider use both as addition agents for lubricants and fuels and as raw materials for the production of other chemicals. Amines and their derivatives are useful as antiknock agents and color stabilizers in motor fuels and as anti-corrosion, anti-sludging, anti-cracking and color stabilizing agents in lubricants. Nitriles are useful oiliness agents in lubricants and are easily converted to amines. Acid amides are particularly valuable organic nitrogen compounds for use as starting materials in the formation of other nitrogenous compounds. Diamines and dinitriles are particularly important as a source of raw materials for the production of superpolyamides such as nylon. The cost of producing these organic nitrogen compounds by present commercial methods is considerable and restricts their use.

I have discovered that organic nitrogen compounds such as amines, nitriles and acid amides may be produced by subjecting a mixture of an olefine, ammonia and water to the action of a catalyst selectively promoting the amination reaction at a temperature from about 450° F. to about 750° F. and under a pressure of about 500 pounds per square inch and upward. I have found that the presence of water in a mixture of an olefine and ammonia under the foregoing reaction conditions not only results in the formation of acid amides in addition to the amines and the nitriles which are produced by the amination of the olefine with ammonia but also is capable of markedly increasing the total yield of organic nitrogen compounds over the yield of organic nitrogen compounds under similar reaction conditions in the absence of water.

Although the amines, nitriles and acid amides, or "organic nitrogen compounds" as they will be referred to collectively herein, are formed to a substantial extent under the foregoing reaction conditions, competing reactions of cracking, polymerization, dehydrogation and hydrogenation take place simultaneously with the amination reaction to an extent which varies considerably with reaction conditions such as temperature and pressure. Cracking appears to be confined principally to the amine produced by the amination reaction, and polymerization of the olefine charged to the amination reaction tends to deplete the olefine charge. Dehydrogenation of the amine to the corresponding nitrile liberates hydrogen with resulting hydrogenation of the olefine charge to form the corresponding paraffin hydrocarbon. I have found that nitrogen fixation, that is, the production of organic nitrogen compounds, in accordance with my invention takes place to an important extent at temperatures from about 450° F. to about 750° F., the extent of nitrogen fixation being generally greater intermediate the extremes of this temperature range than at either extreme of the temperature range. Temperatures from about 500° F. to about 600° F. are highly advantageous and a temperature of about 550° F. is particularly advantageous. Pressures of about 500 pounds per square inch and upward are required within the temperature range of about 450° F. to about 750° F. in order to obtain substantial yields of organic nitrogen compounds. I have found that pressures of about 1000 pounds per square inch and upward may be used with advantage and that pressures of about 2000 pounds to about 3000 pounds per square inch are particularly advantageous.

The unsaturated hydrocarbons which may be aminated to form organic nitrogen compounds in accordance with my invention may be obtained from any available source. Thus, olefines obtained by dehydrogenation of substantially pure aliphatic organic compounds, such for example as paraffinic hydrocarbons or dehydration of aliphatic alcohols, or olefines available in gas mixtures produced in the processing of hydrocarbon oils, as in the refining of petroleum, may be used with advantage. For example, olefines obtained from cracking of hydrocarbons, such as petroleum, and olefines such as polymer gasoline and other olefine polymers may be aminated in accordance with my invention. I have found, however, that olefines having a double bond at the end of the carbon chain are the most active and are most readily aminated under my reaction conditions. Olefines obtained from the cracking of hydrocarbons, such as petroleum, are characterized by a double bond at the end of their carbon chains and for this reason comprise particularly advantageous olefinic charging material for the production of organic nitrogen compounds in accordance with my invention.

I have found that the amount of ammonia used with advantage in accordance with my invention should exceed that amount required theoretically to combine with the olefine charged to the amination reaction. Thus, molar ratios of about 1.6, and higher, mols of ammonia to 1.0 mol of olefine are particularly effective. Ammonia-olefine molar ratios as high as about 4 to 1 have been found to be very effective with respect to nitrogen fixation although ratios substantially higher than about 4 to 1 appear to increase the amount of cracking taking place during the amination reaction.

Amines, nitriles and acid amides may be produced to a substantial extent by the use of a wide range of amounts of water with respect to the amount of olefine charged to the amination reaction. For example, a ratio of about 4 mols of water to 1 mol of olefine is effective, but molar ratios of water to olefine substantially less than unity promote much higher yields of organic nitrogen compounds than molar ratios of water to olefine substantially in excess of unity. I have found that an exceptionally high yield of organic nitrogen compounds may be obtained by the use of a molar ratio of water to olefine of the order of 1 to 4.

Numerous metallic catalysts promote the amination reaction under the reaction conditions. However, cobalt and nickel appear to be the most satisfactory metallic catalysts and of these two catalysts cobalt is superior to nickel. The metallic catalyst is preferably deposited on a suitable support which will form a porous bed with a relatively large contact surface. Metallic cobalt on silica and metallic cobalt on a cobalt silicate support have been found to be effective catalysts for use in accordance with my invention. Although initially similar in activity, the cobalt-on-cobalt silicate catalyst being somewhat less active than the cobalt-on-silica catalyst, these two catalysts differ principally in that the cobalt-on-cobalt silicate catalyst maintains its nitrogen fixation activity for a longer period in use and produces less polymer products than does the cobalt-on-silica catalyst under similar reaction conditions. A catalyst comprising metallic cobalt deposited on a diatomaceous silica has also been found to be capable of selectively promoting the amination reaction.

The following specific operation directed to the catalytic amination of dodecene will illustrate the process of the invention, although it must be understood that my process is not limited to this specific operation. Dodecene-1 was prepared by dehydration of n-lauryl alcohol over granular alumina, the lauryl alcohol being obtained in the form marketed by Du Pont under the trade name of "Palmal No. 23." The olefine was separated from unconverted alcohol by fractionation. The dodecene-1 thus obtained had a boiling point of 421°–425° F., a specific gravity of 0.7634, a refractive index of 1.4330, a bromine addition number of 85.5 and a bromine substitution number of 2.5. The dodecene-1 thus prepared was then used as the olefine charged to the amination process in this example.

Dodecene-1 and aqueous ammonia were delivered to a pump 1, as shown in the accompanying schematic drawing, and the combined charge was forced by means of the pump through line 2 into the preheating zone of the reaction chamber 3. The preheating zone of the reaction chamber comprised the upper portion of the reaction chamber which was electrically heated and which was filled with stainless steel Raschig rings. The lower portion of the reaction chamber comprised the catalyst zone and was filled with pellets of a catalyst comprising metallic cobalt deposited on cobalt silicate. This catalyst was obtained by precipitating cobalt hydroxide on a cobalt silicate precipitate suspended in an aqueous medium. The resulting precipitate was thoroughly washed with water, dried and compressed into one-eighth inch pellets. The pellets were then dried at an elevated temperature in a nitrogen atmosphere and were subsequently reduced in a stream of hydrogen at a temperature of about 660° F. with the resulting production of a pelleted catalyst comprising metallic cobalt deposited on a cobalt silicate support. Drying and reduction of the pellets were effected in the catalyst zone prior to amination in order to avoid oxidation of the cobalt catalyst by the presence of adventitious air. The unreduced pellets contained 46.4% cobalt and 1000 cc. of the pellets was charged to the catalyst zone prior to drying and reduction of the pellets.

The dodecene and aqueous ammonia were pumped into the reaction chamber 3 for about 1.5 hours and were heated to, and maintained at a temperature of 550° F. by the application of heat to the preheating zone of the reaction chamber. An internal pressure of about 2000 pounds per square inch was obtained within the reaction chamber at the expiration of the 1.5-hour charging period. The aqueous ammonia charged to the reaction chamber in this example contained about 94% by weight of free ammonia. The reaction product was then released from the lower portion of the catalyst zone through line 4 and valve 5 at a rate sufficient to maintain a pressure of 2,000 pounds per square inch within the reaction chamber with the simultaneous and continuous charging thereafter of 213 cc. of dodecene per hour and 114 cc. per hour of the aqueous ammonia. The reactants charged to the reaction chamber comprised 4.2 mols of free ammonia and 0.25 mol of water for each mol of olefine. The charging rate represented a space velocity of about 0.2 through the catalyst bed. The reaction product was passed through the cooler 6 and thence to the receiver 7 wherein the product was stabilized to remove gas therefrom. The final liquid product, at atmospheric pressure, was withdrawn from the receiver and lauric acid amide in the form of a finely divided white solid was separated from the other organic nitrogen compounds contained in the liquid product.

In order to obtain an analysis of the final liquid product, the liquid product from which the solid acid amide had been separated was subjected to fractional distillation with the separation of three fractions. The first fraction was that boiling between 150° F. and 400° F. and will be designated herein as the low boiling fraction. The intermediate fraction was that portion of the liquid product boiling between 400° F. and 410° F. and comprised essentially the unreacted dodecene. The high boiling fraction, that is, the fraction boiling above 410° F., contained the major proportion of the amine and nitrile produced during the amination reaction. Nitrogen content determinations, and hence organic nitrogen compound determinations, were made in accordance with the Kjeldahl method in each instance where such determinations are reported herein. Organic nitrogen compounds contained in the low boiling fraction comprised nitrogenous compounds produced essentially by the cracking of the lauryl amine and appeared, by chemical analysis, to be essentially octyl nitrile. The organic compounds contained in the high boiling fraction comprised essentially lauryl amine and lauryl nitrile. Liquid amines and nitriles obtained from the low boiling and high boiling fractions comprised 3.68% by weight of the olefine charged to the amination process, the low boiling organic nitrogen compounds being calculated as octyl nitrile and the high boiling organic nitrogen compounds being calculated as lauryl amine. The solid product obtained by filtration from the liquid reaction products had a melting point of 205° F., a nitrogen content of 7.22 and, when hydrolyzed, had an acid number of 260, thus identifying the compound as lauric acid amide. The lauric acid amide comprised 5.0% by weight of the olefine charged to the amination process. The total yield of organic nitrogen compounds was 8.68% by weight of the olefine charge and represented a yield of 16.5% by weight of the olefine consumed during the amination reaction.

Calculations based on analysis of the low boiling, intermediate, and high boiling fractions for total organic nitrogen compounds in the foregoing example show that 7.7% by weight of the olefine charge was converted to organic nitrogen compounds, 47.5% of the olefine was recovered, and the remainder of the olefine was converted to non-aminated products, 8.5% of this remainder of the olefine charge being cracked, 25.1% being hydrogenated and 7.6% being polymerized.

The following table demonstrates the effect of varying quantities of water on the yield of organic nitrogen compounds. Runs A, B and C were carried out using aqueous ammonia and dodecene-1 as the charging material to the reaction chamber. The aqueous ammonia charged in runs A, B and C contained 28%, 60% and 94% by weight of free ammonia, respectively. Run D was carried out without water being present and using a ratio of ammonia to olefine similar to that ratio used in run C. Each of these four runs were carried out with the cobalt-on-cobalt silicate catalyst described hereinabove and at a temperature of 550° F. and a pressure of 2000 pounds per square inch.

that it is particularly advantageous to maintain relative movement between the catalyst and the reactants. For example, the addition of water to the olefine and ammonia charged in a sealed vessel reduces the total yield of organic nitrogen compounds which is otherwise obtainable in the absence of the water, although the presence of the water leads to the production of a substantial quantity of the acid amide. In operations wherein relative movement between the catalyst and reactants is maintained, as by passing the olefine, ammonia and water through a fixed bed of catalyst, a substantial quantity of the acid amide is not only formed but the presence of the water markedly increases the total yield of organic nitrogen compounds. The process of direct amination of olefines with ammonia and water in accordance with this invention affords a new and less expensive method of producing organic nitrogen compounds such as amines, nitriles, ac'd amides and their derivatives and of producing certain amines, nitriles, acid amides and their derivatives which have not hitherto been produced by commercial methods.

I claim:

1. In the production of amines, nitriles and acid amides, the improvement which comprises subjecting a mixture of an olefine, ammonia and water to the action of a catalyst selectively promoting the amination reaction at a temperature substantially within the range of 450° F. to 750° F. under a pressure of at least substantially 500 pounds per square inch.

2. In the production of amines, nitriles and acid amides, the improvement which comprises subjecting a mixture of an olefine, ammonia and water to the action of a catalyst selectively promoting the amination reaction at a temperature substantially within the range of 500° F. to 600° F. under a pressure of at least substantially 1000 pounds per square inch.

3. In the production of amines, nitriles and acid amides, the improvement which comprises subjecting a mixture of an olefine, ammonia and water to the action of a catalyst selectively pro-

|  | Run | | | |
|---|---|---|---|---|
|  | A | B | C | D |
| Mols olefine: NH₃:H₂O | 1.0: 1.7: 4.2 | 1.0: 1.5: 0.93 | 1.0: 4.2: 0.25 | 1.0: 3.7: 0 |
| Acid amide, wt. percent of olefine charge | 4.2 | 6.3 | 5.0 | |
| Nitrogen fixation wt. percent of olefine charge | 4.62 | 7.76 | 8.68 | 4.7 |
| Nitrogen fixation wt. percent of olefine consumed | 5.86 | 12.0 | 16.5 | 12.7 |

It will be seen from the foregoing tabulation that decreasing amounts of water from about 4 mols to about ¼ mol per mol of olefine increased the yield of organic nitrogen compounds based on olefine consumed. The highest yield of acid amide occurred in run B where 81% by weight of the organic nitrogen compounds was lauric acid amide, although the total yield of organic nitrogen compounds was highest in run C. Comparison of runs C and D shows that under the otherwise substantially identical conditions the yield of organic nitrogen compounds based on olefine consumed when 1 mol of water is used per 4 mols of olefine is 130% as great as when this water is not present.

Although the process of my invention may be carried out by charging ammonia and olefine to a reaction vessel and by maintaining the charge sealed in contact with the catalyst in the vessel for a substantial period of time, I have found moting the amination reaction at a temperature substantially within the range of 500° F. to 600° F. under a pressure substantially within the range of 2000 to 3000 pounds per square inch.

4. In the production of amines, nitriles and acid amides, the improvement which comprises subjecting a mixture of an olefine, ammonia and water to the action of a catalyst selectively promoting the amination reaction at a temperature of substantially 550° F. under a pressure of substantially 2000 pounds.

5. In the production of amines, nitriles and acid amides, the improvement which comprises subjecting a mixture of an olefine, an amount of ammonia substantially in excess of that theoretically required to combine with the olefine, and water to the action of a catalyst selectively promoting the amination reaction at a temperature substantially within the range of 450° F. to 750° F.

under a pressure of at least substantially 500 pounds per square inch.

6. In the production of amines, nitriles and acid amides, the improvement which comprises subjecting a mixture of an olefine, ammonia and water to the action of a catalyst selectively promoting the amination reaction at a temperature substantially within the range of 450° F. to 750° F. under a pressure of at least substantially 500 pounds per square inch, the amount of ammonia being substantially in excess of that required theoretically to combine with the olefine and the molar ratio of water to olefine being less than unity.

7. In the production of amines, nitriles and acid amides, the improvement which comprises subjecting a mixture of olefine, ammonia and water to the action of a catalyst selectively promoting the amination reaction at a temperature substantially within the range of 450° F. to 750° F. under a pressure of at least substantially 500 pounds per square inch, the amount of ammonia being substantially in excess of that required theoretically to combine with the olefine and the molar ratio of water to olefine being of the order of substantially 1:4.

8. In the production of amines, nitriles and acid amides, the improvement which comprises subjecting a mixture of an olefine and aqueous ammonia to the action of a catalyst selectively promoting the amination reaction at a temperature substantially within the range of 450° F. to 750° F. under a pressure of at least substantially 500 pounds per square inch.

9. In the production of amines, nitriles and acid amides, the improvement which comprises subjecting a mixture of an olefine and aqueous ammonia containing substantially 94% free ammonia to the action of a catlyst selectively promoting the amination reaction at a temperature substantially within the range of 450° F. to 750° F. under a pressure of at least substantially 500 pounds per square inch.

10. In the production of amines, nitriles and acid amides, the improvement which comprises passing a mixture of an olefine, ammonia and water through a bed of catalyst selectively promoting the amination reaction at a temperature substantially within the range of 450° F. to 750° F. under a pressure of at least substantially 500 pounds per square inch.

11. In the production of lauryl amine, lauryl nitrile and lauric acid amide, the improvement which comprises subjecting a mixture of dodecene-1, ammonia and water to the action of a metallic cobalt catalyst selectively promoting the amination reaction at a temperature of substantially 550° F. under a pressure of substantially 2000 pounds per square inch.

12. In the production of amines, nitriles and acid amides, the improvement which comprises subjecting a mixture of an olefine, ammonia and water to the action of a metallic cobalt catalyst selectively promoting the amination reaction at a temperature substantially within the range of 450° F. to 750° F. under a pressure of at least substantially 500 pounds per square inch.

13. In the production of amines, nitriles and acid amides, the improvement which comprises subjecting a mixture of an olefine, ammonia and water to the action of a metallic cobalt catalyst selectively promoting the amination reaction at a temperature of substantially 550° F. under a pressure of substantially 2000 pounds.

JOHN W. TETER.